United States Patent
Hudman et al.

(10) Patent No.: US 9,443,310 B2
(45) Date of Patent: Sep. 13, 2016

(54) ILLUMINATION MODULES THAT EMIT STRUCTURED LIGHT

(71) Applicant: Microsoft Corporation, Redmond, WA (US)

(72) Inventors: Joshua Hudman, Issaquah, WA (US); Prafulla Masalkar, Issaquah, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 311 days.

(21) Appl. No.: 14/050,106

(22) Filed: Oct. 9, 2013

(65) Prior Publication Data
US 2015/0097947 A1    Apr. 9, 2015

(51) Int. Cl.
*G06T 7/00* (2006.01)
*G01S 17/89* (2006.01)
(Continued)

(52) U.S. Cl.
CPC .............. *G06T 7/0051* (2013.01); *G01B 11/25* (2013.01); *G01S 7/4815* (2013.01); *G01S 7/4818* (2013.01); *G01S 7/4863* (2013.01); *G01S 17/89* (2013.01); *G02B 27/0922* (2013.01)

(58) Field of Classification Search
CPC .............. G01B 11/002; G01B 11/024; G01B 11/2518; G01B 11/2527; G01B 11/2536; G01B 11/005; G01S 17/89; G01S 11/12; G01S 7/4815; G01S 7/4818; G01S 7/486; G01S 7/499; G01S 17/48; G01S 7/484; H04N 7/181; H04N 13/02; G06K 9/52; G06K 9/00; G01C 3/08; G03B 17/54; G03B 21/14; G03B 35/00
See application file for complete search history.

(56) References Cited

U.S. PATENT DOCUMENTS

| 4,523,809 A | 6/1985 | Taboada et al. |
| 4,627,620 A | 12/1986 | Yang |

(Continued)

FOREIGN PATENT DOCUMENTS

| CN | 101254344 B | 6/2010 |
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Jay Patel
*Assistant Examiner* — Frank Huang
(74) *Attorney, Agent, or Firm* — Gregg Wisdom; Judy Yee; Micky Minhas

(57) ABSTRACT

A depth camera includes an illumination module and an image detector module. The illumination module outputs structured light that illuminates a capture area. The image detector module captures an image of the structured light as reflected from object(s) within the capture area. The illumination module includes a VCSEL array and optical element(s), such as projection optics, an MLA or DOE, or combinations thereof. Projection optics receive a light pattern emitted by the VCSEL array and project the light pattern. An optical element, downstream from the projection optics, can cause a total number of features included in the structured light to be greater than the number of features included in the light pattern projected by the projection optics. In an embodiment, a pitch of an MLA is offset relative to a pitch of the VCSEL array. Various structures can include alignment elements to aid manufacture of the illumination module.

16 Claims, 14 Drawing Sheets

(51) Int. Cl.
  *G01B 11/25* (2006.01)
  *G01S 7/481* (2006.01)
  *G01S 7/486* (2006.01)
  *G02B 27/09* (2006.01)

(56) References Cited

U.S. PATENT DOCUMENTS

| | | |
|---|---|---|
| 4,630,910 A | 12/1986 | Ross et al. |
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson et al. |
| 5,534,917 A | 7/1996 | MacDougall |
| 5,548,418 A | 8/1996 | Gaynor et al. |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,385,708 B2 | 6/2008 | Ackerman et al. |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |

(56) References Cited

U.S. PATENT DOCUMENTS

| | | | |
|---|---|---|---|
| 7,574,020 | B2 | 8/2009 | Shamaie |
| 7,576,727 | B2 | 8/2009 | Bell |
| 7,590,262 | B2 | 9/2009 | Fujimura et al. |
| 7,593,552 | B2 | 9/2009 | Higaki et al. |
| 7,598,942 | B2 | 10/2009 | Underkoffler et al. |
| 7,607,509 | B2 | 10/2009 | Schmiz et al. |
| 7,620,202 | B2 | 11/2009 | Fujimura et al. |
| 7,668,340 | B2 | 2/2010 | Cohen et al. |
| 7,680,298 | B2 | 3/2010 | Roberts et al. |
| 7,683,954 | B2 | 3/2010 | Ichikawa et al. |
| 7,684,592 | B2 | 3/2010 | Paul et al. |
| 7,701,439 | B2 | 4/2010 | Hillis et al. |
| 7,702,130 | B2 | 4/2010 | Im et al. |
| 7,704,135 | B2 | 4/2010 | Harrison, Jr. |
| 7,710,391 | B2 | 5/2010 | Bell et al. |
| 7,729,530 | B2 | 6/2010 | Antonov et al. |
| 7,746,345 | B2 | 6/2010 | Hunter |
| 7,763,841 | B1 | 6/2010 | McEldowney |
| 7,760,182 | B2 | 7/2010 | Ahmad et al. |
| 7,809,167 | B2 | 10/2010 | Bell |
| 7,834,846 | B1 | 11/2010 | Bell |
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,320,621 | B2 | 11/2012 | McEldowney |
| 8,493,496 | B2 | 7/2013 | Freedman et al. |
| 9,151,830 | B2 * | 10/2015 | Bridges ............... G01C 15/002 |
| 2007/0091302 | A1 | 4/2007 | Harding et al. |
| 2007/0273957 | A1 | 11/2007 | Zalevsky et al. |
| 2008/0026838 | A1 | 1/2008 | Dunstan et al. |
| 2010/0008588 | A1 * | 1/2010 | Feldkhun ........... G01B 11/2518 382/206 |
| 2010/0284082 | A1 | 11/2010 | Shpunt et al. |
| 2010/0290698 | A1 | 11/2010 | Freedman et al. |
| 2011/0310226 | A1 | 12/2011 | McEldowney |
| 2012/0017153 | A1 | 1/2012 | Matsuda et al. |
| 2012/0051588 | A1 * | 3/2012 | McEldowney ......... G03B 17/54 382/103 |
| 2012/0265479 | A1 * | 10/2012 | Bridges ............... G01C 15/002 702/135 |
| 2012/0307075 | A1 | 12/2012 | Margalit |
| 2013/0147353 | A1 * | 6/2013 | Mandelboum ..... H05B 33/0851 315/119 |
| 2014/0241614 | A1 * | 8/2014 | Lee ..................... H04N 13/004 382/154 |
| 2015/0071524 | A1 * | 3/2015 | Lee ..................... G06T 7/0075 382/154 |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |
| WO | 2008120217 A2 | 10/2008 |
| WO | 2011/070313 A1 | 6/2011 |
| WO | 2013/132494 A1 | 9/2013 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collision of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

English Machine-translation of Japanese Publication No. JP08-044490 published on Feb. 16, 1996.

(56) References Cited

OTHER PUBLICATIONS

International Search Report and Written Opinion mailed Jan. 15, 2015, in PCT Patent Application No. PCT/US2014/059209 filed Oct. 9, 2014.
PCT Demand and Amendment filed Apr. 29, 2015, in PCT Patent Application No. PCT/US2014/059209 filed Oct. 9, 2014.
Second Written Opinion Issued in PCT Application Number mailed Aug. 24, 2015, in International Patent Appl. No. PCT/US2014/059209 filed Oct. 9, 2014, 6 Pages.
"International Preliminary Report on Patentability Issued in PCT Application No. PCT/US2014/059209", Mailed Date: Jan. 7, 2016, 7 Pages. (MS# 339701.02).

* cited by examiner

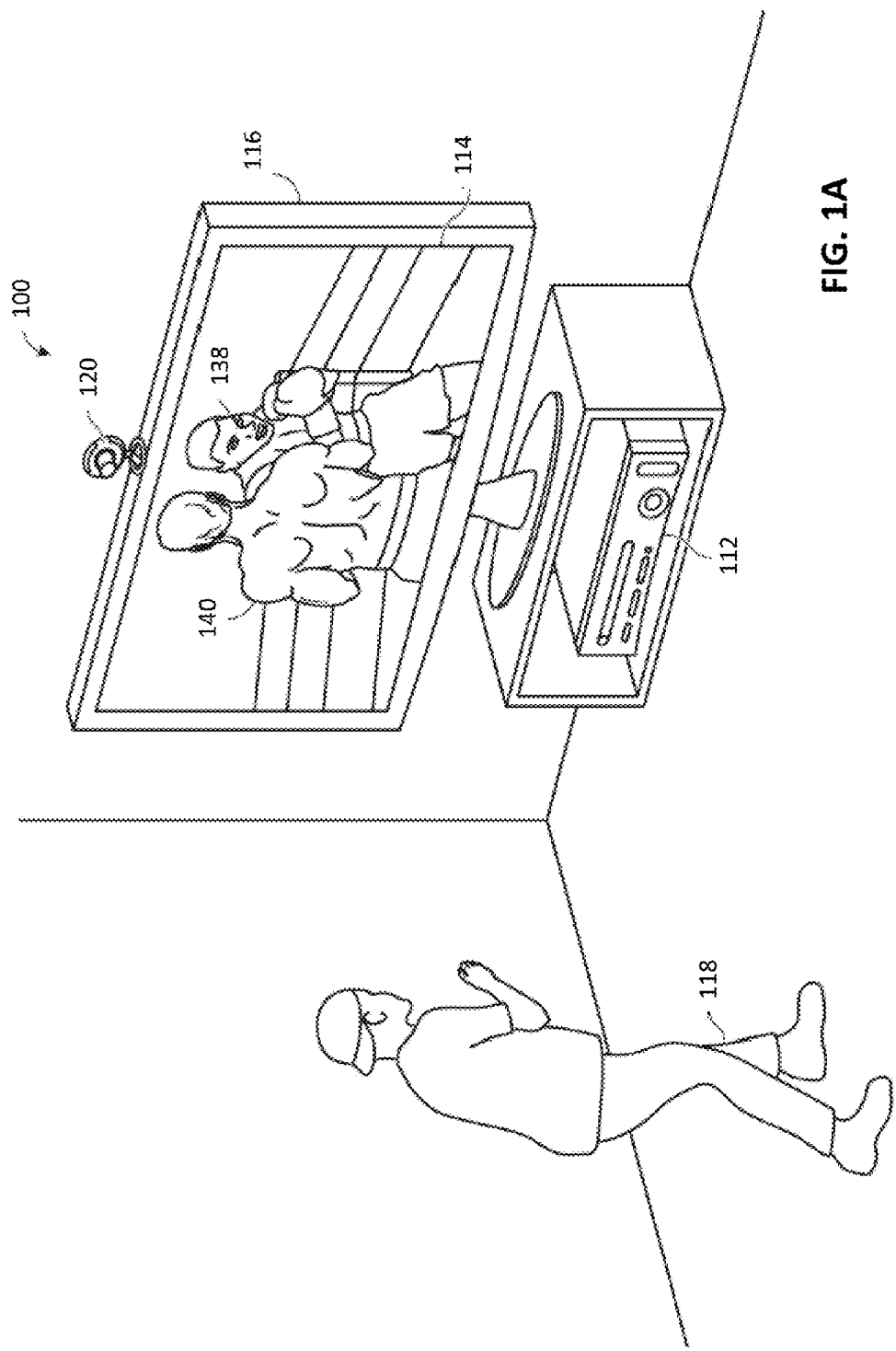

FIG. 6

ILLUMINATION MODULES THAT EMIT STRUCTURED LIGHT

BACKGROUND

A depth camera can obtain depth images including information about a location of a human or other object in a physical space. The depth images may be used by an application in a computing system for a wide variety of applications. Many applications are possible, such as for military, entertainment, sports and medical purposes. For instance, depth images including information about a human can be mapped to a three-dimensional (3-D) human skeletal model and used to create an animated character or avatar.

To obtain a depth image, a depth camera typically projects infrared (IR) light onto one or more object in the camera's field of view, which may also be referred to as the capture area. The IR light reflects off the object(s) and back to the camera, where it is incident on an image pixel detector array of the camera, and is processed to determine the depth image.

Some depth cameras utilize structured light to illuminate a capture area. Such a depth camera may utilize a collimated laser diode and a diffractive optical element (DOE) to produce the structured light. However, depending on the area to be illuminated, a collimated laser diode may not provide a sufficient amount of light. Additionally, limiting the pointing tolerance for such a configuration could be difficult.

SUMMARY

Certain embodiments disclosed herein relate to a depth camera that includes an illumination module and an image detector module. The illumination module outputs structured light that illuminates a capture area. The image detector module captures an image of the structured light as reflected from one or more objects within the capture area. One or more processors of or associated with the depth camera system produce a depth image in dependence on the image captured by the image capture module, and use the depth image to update an application. Certain embodiments disclosed herein, some of which are summarized below, focus on certain details of the illumination module that outputs structured light.

In accordance with an embodiment, the illumination module includes a VCSEL array and projection optics. The VCSEL array includes a plurality of vertical cavity surface emitting lasers (VCSELs), each of which emits a separate beam of light, and which collectively emit a light pattern. The projection optics receive the light pattern emitted by the VCSELs of the VCSEL array and project the light pattern. The projection optics can include a field lens and an objective lens. The field lens receives the beams of light emitted by the VCSELs of the VCSEL array and converge the beams. The objective lens receives the converged beams from the field lens and diverge the beams to produce the light pattern projected by the projection optics. The light pattern projected by the projection optics includes a number of features, such as, spots or dots, but not limited thereto. The structured light output by the illumination module is created at least in part based on light pattern projected by the projection optics. This means that the light pattern projected by the projection optics can be the structured light output by the illumination module, or alternatively, the light pattern projected by the projection optics may be provided to one or more optical element (such as a DOE or beam splitter) optically downstream from the projection optics, with the output of the most downstream optical element (e.g., the DOE or beam splitter) being the structured light output by the illumination module. In accordance with certain embodiments, the illumination module also includes an optical element, optically downstream from the projection optics, which causes a total number of features included in the structured light output by the illumination module to be greater than the number of features included in the light pattern projected by the projection optics. For example, the illumination module can include diffractive optical element (DOE) configured to cause the total number of features included in the structured light output by the illumination module to be an integer multiple of the number of features included in the light pattern projected by the projection optics. Alternatively, the illumination module can include a beam slitter that doubles the number of features included in the light pattern projected by the projection optics.

In accordance with an embodiment, the illumination module includes a VCSEL array including a plurality of VCSELs having a first pitch, and a micro-lens array (MLA) having a second pitch that is offset relative to the first pitch of VCSEL array, which causes light beams received by the MLA, from the VCSEL array, to converge. Additionally, the illumination module includes a DOE that receives the converged light beams from the MLA and outputs the structured light that illuminates the capture area. More specifically, the pitch of the MLA can be less than the pitch of the VCSEL array, and the MLA can cause the light beams (received by the MLA from the VCSEL array) to converge to a single pupil at which is located the DOE. The light pattern output by the MLA includes a number of features. In accordance with an embodiment, the DOE can cause the total number of features included in the structured light output by the illumination module to be an integer multiple of the number of features included in the light pattern output by the MLA.

In accordance with an embodiment, the VCSEL array is formed on a semiconductor substrate that includes first alignment elements, and the MLA includes second alignment elements configured to align with the first alignment elements. Such alignment elements can be used to enable components of an illumination module to be more easily and accurately aligned with one another during manufacture of the illumination module.

In accordance with an embodiment, the illumination module includes a VCSEL array, and first and second DOEs. The first DOE collimates each beam of light output by each of the plurality of VCSELs of the VCSEL array. The second DOE receives the collimated beams produced by the first DOE and outputs the structured light. In accordance with an embodiment, the second DOE can cause the total number of features included in the structured light output by the illumination module to be an integer multiple of the number of features included in a light pattern output by the first DOE.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 1A and 1B illustrate an example embodiment of a tracking system with a user playing a game.

FIG. 6 depicts exemplary data in an exemplary depth image.

DETAILED DESCRIPTION

Certain embodiments of the present technology disclosed herein are related to a depth camera that includes an illumination module and an image detector module, wherein the illumination module outputs structured light that illuminates a capture area, and the image detector module captures an image of the structured light as reflected from one or more objects within the capture area. However, before providing additional details of such embodiments of the present technology, exemplary details of larger systems with which embodiments of the present technology can be used will first be described.

Figure 1B:
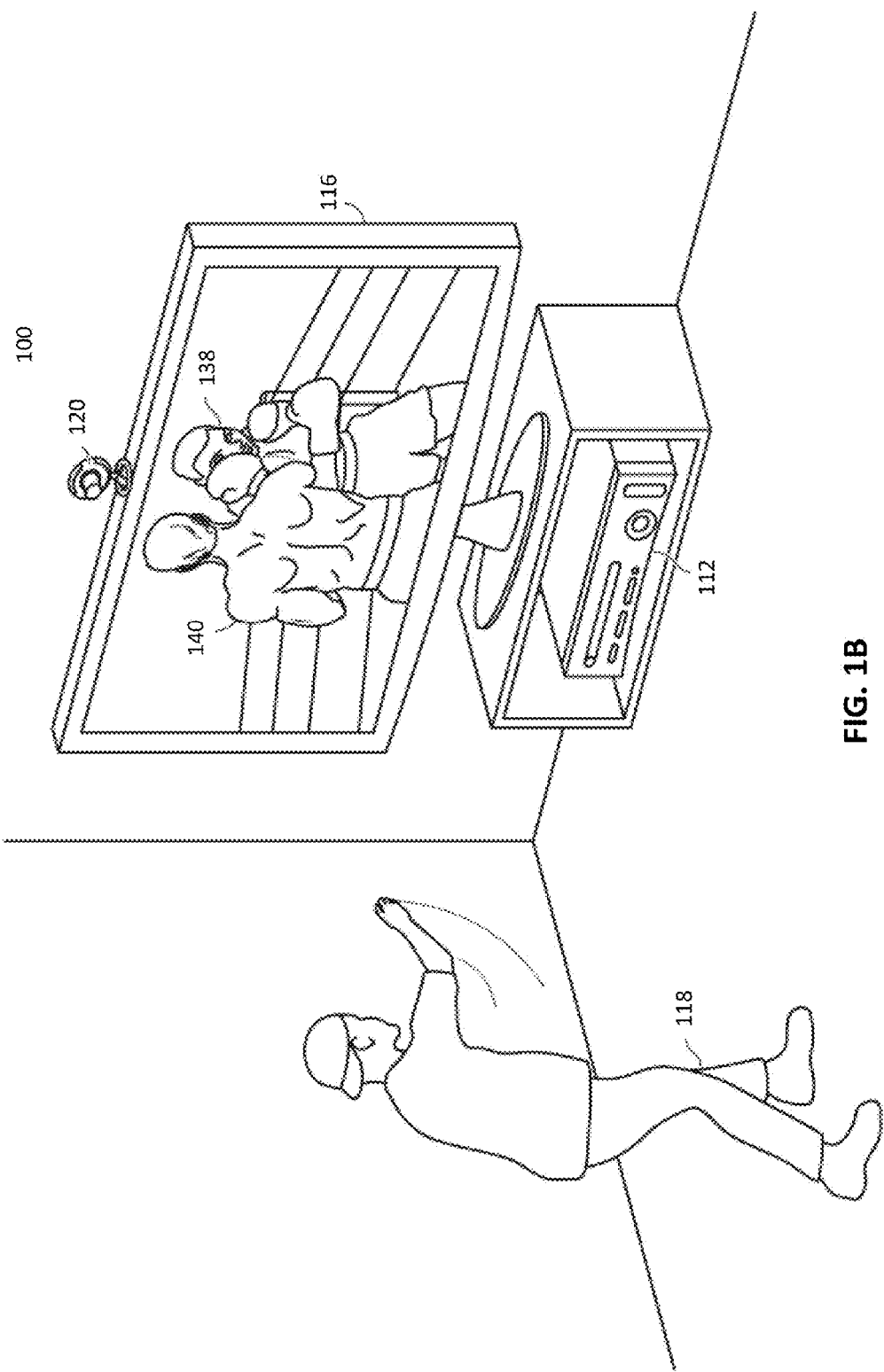

FIGS. 1A and 1B illustrate an example embodiment of a tracking system 100 with a user 118 playing a boxing video game. In an example embodiment, the tracking system 100 may be used to recognize, analyze, and/or track a human target such as the user 118 or other objects within range of the tracking system 100. As shown in FIG. 1A, the tracking system 100 includes a computing system 112 and a capture device 120. As will be describe in additional detail below, the capture device 120 can be used to obtain depth images and color images (also known as RGB images) that can be used by the computing system 112 to identify one or more users or other objects, as well as to track motion and/or other user behaviors. The tracked motion and/or other user behavior can be used to update an application. Therefore, a user can manipulate game characters or other aspects of the application by using movement of the user's body and/or objects around the user, rather than (or in addition to) using controllers, remotes, keyboards, mice, or the like. For example, a video game system can update the position of images displayed in a video game based on the new positions of the objects or update an avatar based on motion of the user.

The computing system 112 may be a computer, a gaming system or console, or the like. According to an example embodiment, the computing system 112 may include hardware components and/or software components such that computing system 112 may be used to execute applications such as gaming applications, non-gaming applications, or the like. In one embodiment, computing system 112 may include a processor such as a standardized processor, a specialized processor, a microprocessor, or the like that may execute instructions stored on a processor readable storage device for performing the processes described herein.

The capture device 120 may include, for example, a camera that may be used to visually monitor one or more users, such as the user 118, such that gestures and/or movements performed by the one or more users may be captured, analyzed, and tracked to perform one or more controls or actions within the application and/or animate an avatar or on-screen character, as will be described in more detail below.

According to one embodiment, the tracking system 100 may be connected to an audiovisual device 116 such as a television, a monitor, a high-definition television (HDTV), or the like that may provide game or application visuals and/or audio to a user such as the user 118. For example, the computing system 112 may include a video adapter such as a graphics card and/or an audio adapter such as a sound card that may provide audiovisual signals associated with the game application, non-game application, or the like. The audiovisual device 116 may receive the audiovisual signals from the computing system 112 and may then output the game or application visuals and/or audio associated with the audiovisual signals to the user 118. According to one embodiment, the audiovisual device 16 may be connected to the computing system 112 via, for example, an S-Video cable, a coaxial cable, an HDMI cable, a DVI cable, a VGA cable, component video cable, or the like.

As shown in FIGS. 1A and 1B, the tracking system 100 may be used to recognize, analyze, and/or track a human target such as the user 118. For example, the user 118 may be tracked using the capture device 120 such that the gestures and/or movements of user 118 may be captured to animate an avatar or on-screen character and/or may be interpreted as controls that may be used to affect the application being executed by computing system 112. Thus, according to one embodiment, the user 118 may move his or her body to control the application and/or animate the avatar or on-screen character.

In the example depicted in FIGS. 1A and 1B, the application executing on the computing system 112 may be a boxing game that the user 118 is playing. For example, the computing system 112 may use the audiovisual device 116 to provide a visual representation of a boxing opponent 138 to the user 118. The computing system 112 may also use the audiovisual device 116 to provide a visual representation of a player avatar 140 that the user 118 may control with his or her movements. For example, as shown in FIG. 1B, the user 118 may throw a punch in physical space to cause the player avatar 140 to throw a punch in game space. Thus, according to an example embodiment, the computer system 112 and the capture device 120 recognize and analyze the punch of the user 118 in physical space such that the punch may be interpreted as a game control of the player avatar 140 in game space and/or the motion of the punch may be used to animate the player avatar 140 in game space.

Other movements by the user 118 may also be interpreted as other controls or actions and/or used to animate the player avatar, such as controls to bob, weave, shuffle, block, jab, or throw a variety of different power punches. Furthermore, some movements may be interpreted as controls that may correspond to actions other than controlling the player avatar 140. For example, in one embodiment, the player may use movements to end, pause, or save a game, select a level, view high scores, communicate with a friend, etc. According to another embodiment, the player may use movements to select the game or other application from a main user interface. Thus, in example embodiments, a full range of motion of the user 118 may be available, used, and analyzed in any suitable manner to interact with an application.

In example embodiments, the human target such as the user 118 may have an object. In such embodiments, the user of an electronic game may be holding the object such that the motions of the player and the object may be used to adjust and/or control parameters of the game. For example, the motion of a player holding a racket may be tracked and utilized for controlling an on-screen racket in an electronic sports game. In another example embodiment, the motion of a player holding an object may be tracked and utilized for controlling an on-screen weapon in an electronic combat game. Objects not held by the user can also be tracked, such as objects thrown, pushed or rolled by the user (or a different user) as well as self-propelled objects. In addition to boxing, other games can also be implemented.

According to other example embodiments, the tracking system 100 may further be used to interpret target movements as operating system and/or application controls that are outside the realm of games. For example, virtually any controllable aspect of an operating system and/or application may be controlled by movements of the target such as the user 118.

Figure 2A:
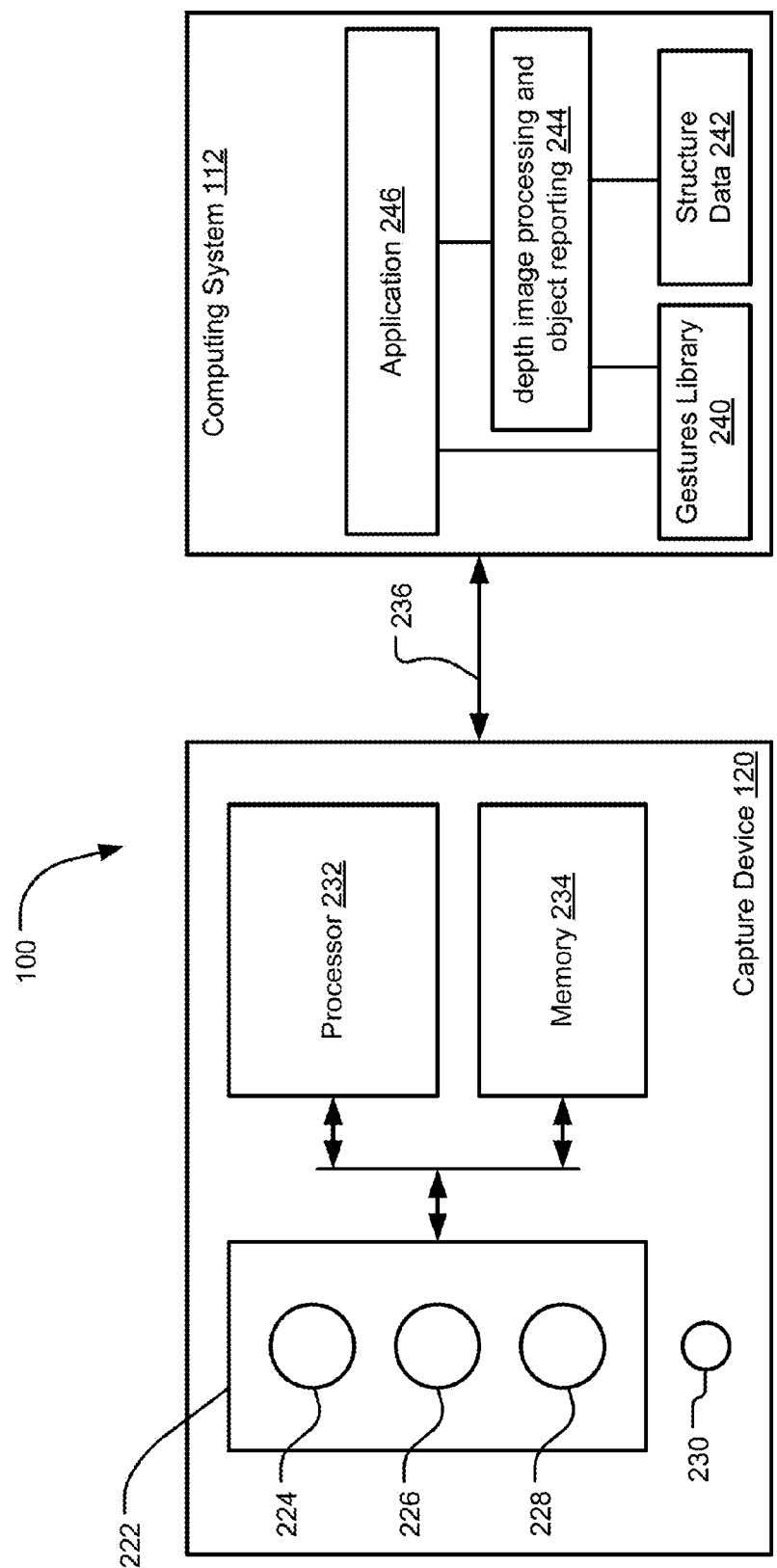
FIG. 2A illustrates an example embodiment of a capture device that may be used as part of the tracking system.

FIG. 2A illustrates an example embodiment of the capture device 120 that may be used in the tracking system 100. According to an example embodiment, the capture device 120 may be configured to capture video with depth information including a depth image that may include depth values via any suitable technique including, for example, time-of-flight, structured light, stereo image, or the like. According to one embodiment, the capture device 120 may organize the depth information into "Z layers," or layers that may be perpendicular to a Z axis extending from the depth camera along its line of sight.

As shown in FIG. 2A, the capture device 120 may include an image camera component 222. According to an example embodiment, the image camera component 222 may be a depth camera that may capture a depth image of a scene. The depth image may include a two-dimensional (2-D) pixel area of the captured scene where each pixel in the 2-D pixel area may represent a depth value such as a distance in, for example, centimeters, millimeters, or the like of an object in the captured scene from the camera.

As shown in FIG. 2A, according to an example embodiment, the image camera component 222 may include an infra-red (IR) light component 224, a three-dimensional (3-D) camera 226, and an RGB camera 228 that may be used to capture the depth image of a scene. For example, in time-of-flight (TOF) analysis, the IR light component 224 of the capture device 120 may emit an infrared light onto the scene and may then use sensors (not specifically shown in FIG. 2A) to detect the backscattered light from the surface of one or more targets and objects in the scene using, for example, the 3-D camera 226 and/or the RGB camera 228. In some embodiments, pulsed IR light may be used such that the time between an outgoing light pulse and a corresponding incoming light pulse may be measured and used to determine a physical distance from the capture device 120 to a particular location on the targets or objects in the scene. Additionally or alternatively, the phase of the outgoing light wave may be compared to the phase of the incoming light wave to determine a phase shift. The phase shift may then be used to determine a physical distance from the capture device to a particular location on the targets or objects.

In another example embodiment, the capture device 120 may use a structured light to capture depth information. In such an analysis, patterned light (i.e., light displayed as a known pattern such as a grid of dots, spots or lines, a stripe pattern, or different pattern) may be projected onto the scene via, for example, the IR light component 224. Upon striking the surface of one or more targets or objects in the scene, the pattern may become deformed in response. Such a deformation of the pattern may be captured by, for example, the 3-D camera 226 and/or the RGB camera 228 and may then be analyzed to determine a physical distance from the capture device to a particular location on the targets or objects. In some implementations, the IR Light component 224 is displaced from the cameras 226 and 228 so triangulation can be used to determined distance from cameras 226 and 228. In some implementations, the capture device 120 will include a dedicated IR sensor to sense the IR light.

According to another embodiment, the capture device 120 may include two or more physically separated cameras that may view a scene from different angles to obtain visual stereo data that may be resolved to generate depth information. Other types of depth image sensors can also be used to create a depth image.

The capture device 120 may further include a microphone 230. The microphone 230 may include a transducer or sensor that may receive and convert sound into an electrical signal. According to one embodiment, the microphone 230 may be used to reduce feedback between the capture device 120 and the computing system 112 in the target recognition, analysis, and tracking system 100. Additionally, the microphone 230 may be used to receive audio signals (e.g., voice commands) that may also be provided by the user to control applications such as game applications, non-game applications, or the like that may be executed by the computing system 112.

In an example embodiment, the capture device 120 may further include a processor 232 that may be in operative communication with the image camera component 222. The processor 232 may include a standardized processor, a specialized processor, a microprocessor, or the like that may execute instructions including, for example, instructions for receiving a depth image, generating the appropriate data format (e.g., frame) and transmitting the data to computing system 112.

The capture device 120 may further include a memory component 234 that may store the instructions that may be executed by the processor 232, images or frames of images captured by the 3-D camera and/or RGB camera, or any other suitable information, images, or the like. According to an example embodiment, the memory component 234 may include random access memory (RAM), read only memory (ROM), cache, Flash memory, a hard disk, or any other suitable storage component. As shown in FIG. 2A, in one embodiment, the memory component 234 may be a separate component in communication with the image capture component 222 and the processor 232. According to another embodiment, the memory component 234 may be integrated into the processor 232 and/or the image capture component 222.

As shown in FIG. 2A, the capture device 120 may be in communication with the computing system 212 via a communication link 236. The communication link 236 may be a wired connection including, for example, a USB connection, a Firewire connection, an Ethernet cable connection, or the like and/or a wireless connection such as a wireless 802.11b, g, a, or n connection. According to one embodiment, the computing system 112 may provide a clock to the capture device 120 that may be used to determine when to capture, for example, a scene via the communication link 236. Additionally, the capture device 120 provides the depth images and color images captured by, for example, the 3-D camera 226 and/or the RGB camera 228 to the computing system 112 via the communication link 236. In one embodiment, the depth images and color images are transmitted at 30 frames per second. The computing system 112 may then use the model, depth information, and captured images to, for example, control an application such as a game or word processor and/or animate an avatar or on-screen character.

Computing system 112 includes gestures library 240, structure data 242, depth image processing and object reporting module 244 and application 246. Depth image processing and object reporting module 244 uses the depth images to track motion of objects, such as the user and other objects. To assist in the tracking of the objects, depth image processing and object reporting module 244 uses gestures library 240 and structure data 242.

Structure data 242 includes structural information about objects that may be tracked. For example, a skeletal model of a human may be stored to help understand movements of the user and recognize body parts. Structural information about inanimate objects may also be stored to help recognize those objects and help understand movement.

Gestures library 240 may include a collection of gesture filters, each comprising information concerning a gesture that may be performed by the skeletal model (as the user moves). The data captured by the cameras 226, 228 and the capture device 120 in the form of the skeletal model and movements associated with it may be compared to the gesture filters in the gesture library 240 to identify when a user (as represented by the skeletal model) has performed one or more gestures. Those gestures may be associated with various controls of an application. Thus, the computing system 112 may use the gestures library 240 to interpret movements of the skeletal model and to control application 246 based on the movements. As such, gestures library may be used by depth image processing and object reporting module 244 and application 246.

Application 246 can be a video game, productivity application, etc. In one embodiment, depth image processing and object reporting module 244 will report to application 246 an identification of each object detected and the location of the object for each frame. Application 246 will use that information to update the position or movement of an avatar or other images in the display.

Figure 2B:
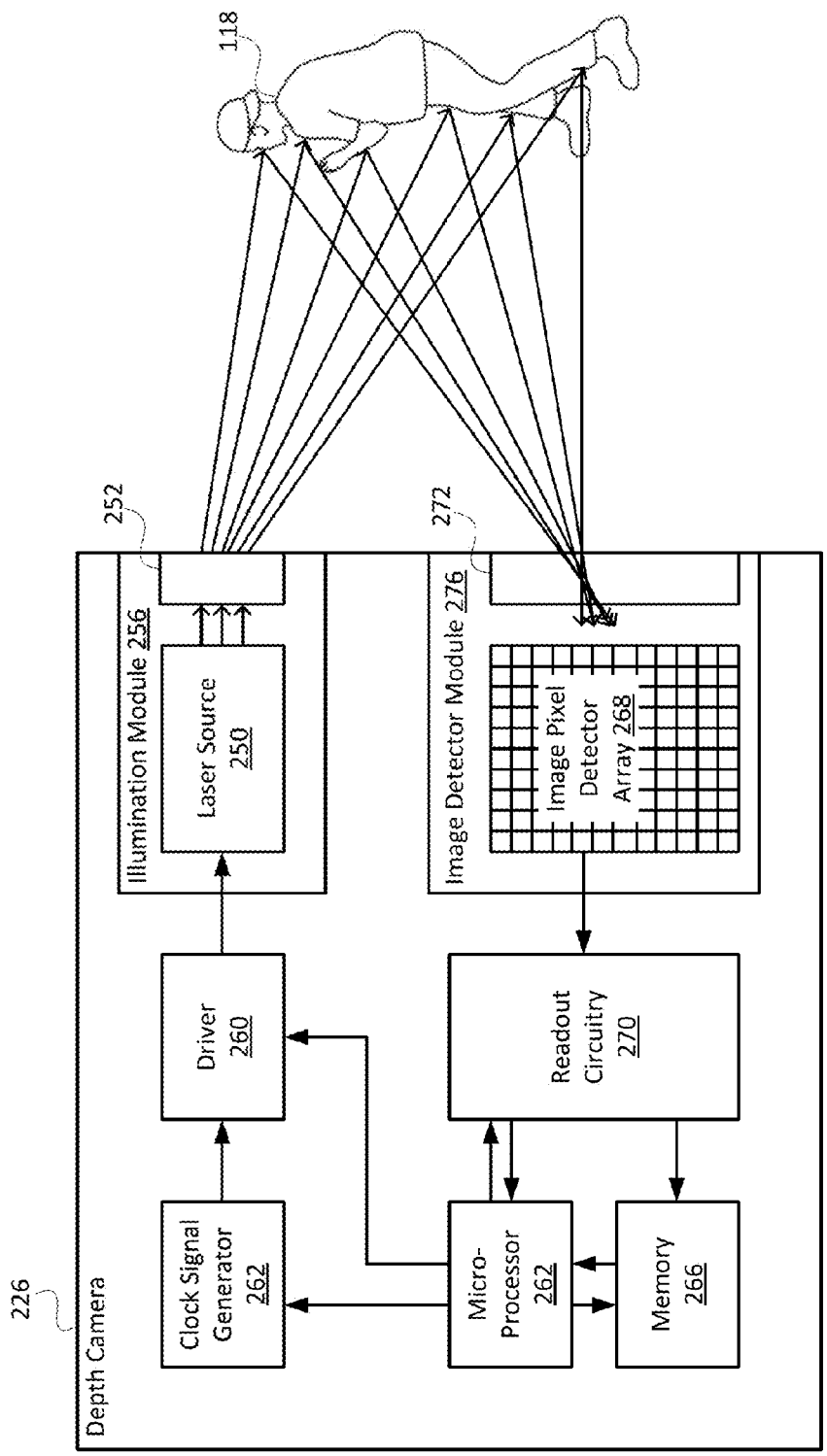
FIG. 2B illustrates an exemplary embodiment of a depth camera that may be part of the capture device of FIG. 2A.

FIG. 2B illustrates an example embodiment of a 3-D camera 226, which can also be referred to as a depth camera 226 or a depth camera system. The depth camera 226 is shown as including an illumination module 256 and an image detector module 276. The illumination module is shown as including a laser source 250 and an optical structure 252. The laser source 250 can be, e.g., the IR light component 224 shown in FIG. 2A. More specifically, the laser source 250 can include one or more laser emitting elements, such as, but not limited to, edge emitting lasers or vertical-cavity surface-emitting lasers (VCSELs). While it is likely that such laser emitting elements emit IR light, light of alternative wavelengths can alternatively be emitted by the laser emitting elements. As will be described in additional detail below, with reference to FIGS. 7A-10B, the optical structure 252 can include elements such as, but not limited to, projection optics, a micro-lens array (MLA), one or more diffractive optical elements (DOE), a beam-splitter, or combinations thereof. In accordance with certain embodiments, the optical structure 252 receives laser light from the laser source 250 and outputs structured light that illuminates a capture area.

The image detector module 276 can capture an image of the structured light as reflected from one or more objects (e.g., the user 118) within the capture area. The image detector module 276 is shown as including an image pixel detector array 268. The image pixel detector array 268 might include, e.g., 320×240 image pixel detectors, but is not limited thereto. Each image pixel detector can be, e.g., a complementary metal-oxide-semiconductor (CMOS) sensor or a charged coupled device (CCD) sensor, but is not limited thereto. The image detector module 276 can also include its own optical structure 272, which can include, e.g., a field stop and/or one or more lenses, but is not limited thereto.

The depth camera 226 is also shown as including a driver 260 and clock signal generator 262 that produces a clock signal that is provided to the driver 260. Additionally, the depth camera 226 is shown as including a microprocessor 264 that can control the clock signal generator 262 and/or the driver 260. The depth camera 226 is also shown as including readout circuitry 270 and memory 266. Depending upon implementation, each image pixel detector can have its own dedicated readout circuit, or readout circuitry can be shared by many image pixel detectors. In accordance with an embodiment, the driver 260 drives the laser source 250 to cause the laser source to emit light. Accordingly, the driver 260 can include, for example, one or more buffers, amplifiers and/or modulators, but is not limited thereto. The clock signal generator 262 can include, for example, one or more reference clocks and/or voltage controlled oscillators, but is not limited thereto. The microprocessor 264, which can be part of a microcontroller unit, can be used to control the clock signal generator 262 and/or the driver 260. The depth camera 226 can includes its own memory 266 and microprocessor 264, as shown in FIG. 2B. Alternatively, or additionally, the processor 232 and/or memory component 234 of the capture device 120 can be used to control aspects of the depth camera 226.

Assuming that there is a target object within the field of view of the depth camera, a portion of the light emitted by the illumination module reflects off the target object, passes through an aperture field stop and lens (collectively referred to as optical structure 272), and is incident on the image pixel detector array 268 where an image is formed. The readout circuitry 270 converts analog values generated by the image pixel detector array 268 into digital readout signals, which are provided to the microprocessor 264 and/or the memory 266, and which can be used to produce depth images.

Figure 3:
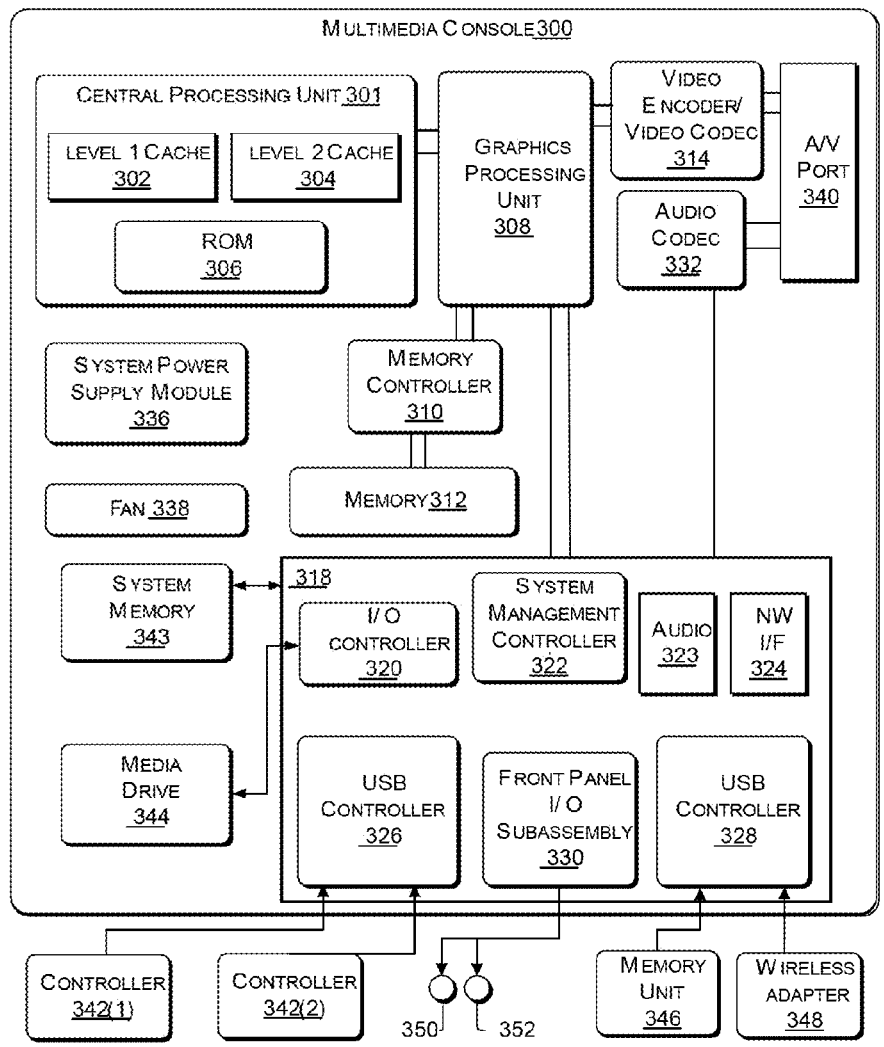
FIG. 3 illustrates an example embodiment of a computing system that may be used to track user behavior and update an application based on the user behavior.

FIG. 3 illustrates an example embodiment of a computing system that may be the computing system 112 shown in FIGS. 1A-2B used to track motion and/or animate (or otherwise update) an avatar or other on-screen object displayed by an application. The computing system such as the computing system 112 described above with respect to FIGS. 1A-2 may be a multimedia console, such as a gaming console. As shown in FIG. 3, the multimedia console 300 has a central processing unit (CPU) 301 having a level 1 cache 102, a level 2 cache 304, and a flash ROM (Read Only Memory) 306. The level 1 cache 302 and a level 2 cache 304 temporarily store data and hence reduce the number of memory access cycles, thereby improving processing speed and throughput. The CPU 301 may be provided having more than one core, and thus, additional level 1 and level 2 caches 302 and 304. The flash ROM 306 may store executable code that is loaded during an initial phase of a boot process when the multimedia console 300 is powered ON.

A graphics processing unit (GPU) 308 and a video encoder/video codec (encoder/decoder) 314 form a video processing pipeline for high speed and high resolution graphics processing. Data is carried from the GPU 308 to the encoder/decoder 314 via a bus. The video processing pipeline outputs data to an A/V (audio/video) port 340 for transmission to a television or other display. A memory controller 310 is connected to the GPU 308 to facilitate processor access to various types of memory 312, such as, but not limited to, a RAM (Random Access Memory).

The multimedia console 300 includes an I/O controller 320, a system management controller 322, an audio processing unit 323, a network interface 324, a first USB host controller 326, a second USB controller 328 and a front panel I/O subassembly 330 that are preferably implemented on a module 318. The USB controllers 326 and 328 serve as hosts for peripheral controllers 342(1)-342(2), a wireless adapter 348, and an external memory device 346 (e.g., flash memory, external CD/DVD ROM drive, removable media, etc.). The network interface 324 and/or wireless adapter 348 provide access to a network (e.g., the Internet, home network, etc.) and may be any of a wide variety of various wired or wireless adapter components including an Ethernet card, a modem, a Bluetooth module, a cable modem, and the like.

System memory 343 is provided to store application data that is loaded during the boot process. A media drive 344 is provided and may comprise a DVD/CD drive, Blu-Ray drive, hard disk drive, or other removable media drive, etc. The media drive 344 may be internal or external to the multimedia console 300. Application data may be accessed via the media drive 344 for execution, playback, etc. by the multimedia console 300. The media drive 344 is connected to the I/O controller 320 via a bus, such as a Serial ATA bus or other high speed connection (e.g., IEEE 1394).

The system management controller 322 provides a variety of service functions related to assuring availability of the multimedia console 300. The audio processing unit 323 and an audio codec 332 form a corresponding audio processing pipeline with high fidelity and stereo processing. Audio data is carried between the audio processing unit 323 and the audio codec 332 via a communication link. The audio processing pipeline outputs data to the A/V port 340 for reproduction by an external audio player or device having audio capabilities.

The front panel I/O subassembly 330 supports the functionality of the power button 350 and the eject button 352, as well as any LEDs (light emitting diodes) or other indicators exposed on the outer surface of the multimedia console 300. A system power supply module 336 provides power to the components of the multimedia console 300. A fan 338 cools the circuitry within the multimedia console 300.

The CPU 301, GPU 308, memory controller 310, and various other components within the multimedia console 300 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 300 is powered ON, application data may be loaded from the system memory 343 into memory 312 and/or caches 302, 304 and executed on the CPU 301. The application may present a graphical user interface that provides a consistent user experience when navigating to different media types available on the multimedia console 300. In operation, applications and/or other media contained within the media drive 344 may be launched or played from the media drive 344 to provide additional functionalities to the multimedia console 300.

The multimedia console 300 may be operated as a standalone system by simply connecting the system to a television or other display. In this standalone mode, the multimedia console 300 allows one or more users to interact with the system, watch movies, or listen to music. However, with the integration of broadband connectivity made available through the network interface 324 or the wireless adapter 348, the multimedia console 300 may further be operated as a participant in a larger network community.

When the multimedia console 300 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 Kbps), etc. Because these resources are reserved at system boot time, the reserved resources do not exist from the application's view.

In particular, the memory reservation preferably is large enough to contain the launch kernel, concurrent system applications and drivers. The CPU reservation is preferably constant such that if the reserved CPU usage is not used by the system applications, an idle thread will consume any unused cycles.

With regard to the GPU reservation, lightweight messages generated by the system applications (e.g., popups) are displayed by using a GPU interrupt to schedule code to render popup into an overlay. The amount of memory required for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV resynch is eliminated.

After the multimedia console 300 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 301 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 342(1) and 342(2)) are shared by gaming applications and system applications. The input devices are not reserved resources, but are to be switched between system applications and the gaming application such that each will have a focus of the device. The application manager preferably controls the switching of input stream, without knowledge the gaming application's knowledge and a driver maintains state information regarding focus switches. The cameras 226, 228 and capture device 120 may define additional input devices for the console 300 via USB controller 326 or other interface.

Figure 4:
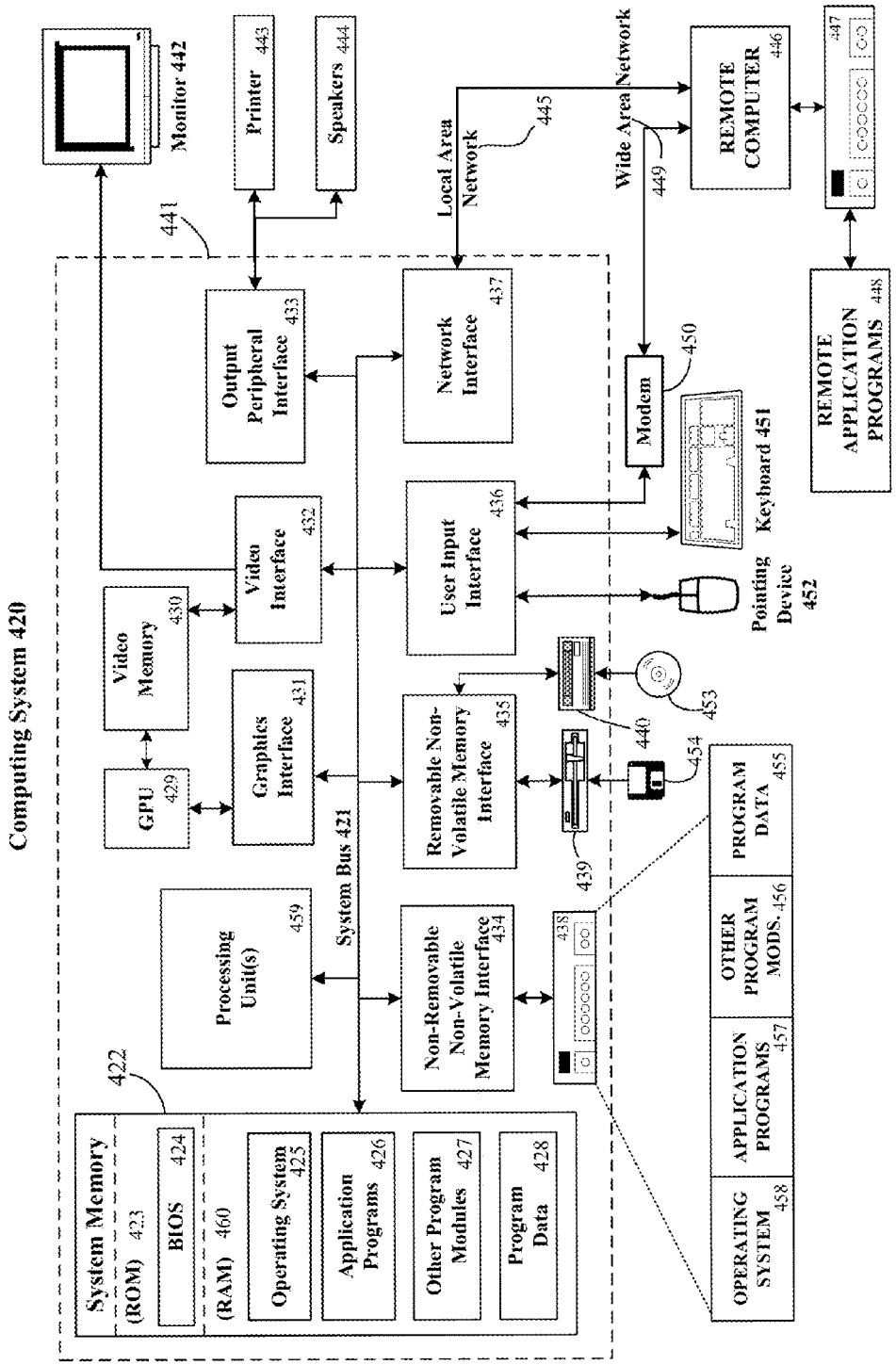
FIG. 4 illustrates another example embodiment of a computing system that may be used to track user behavior and update an application based on the tracked user behavior.

FIG. 4 illustrates another example embodiment of a computing system 420 that may be the computing system 112 shown in FIGS. 1A-2B used to track motion and/or animate (or otherwise update) an avatar or other on-screen object displayed by an application. The computing system 420 is only one example of a suitable computing system and is not intended to suggest any limitation as to the scope of use or functionality of the presently disclosed subject matter. Neither should the computing system 420 be interpreted as having any dependency or requirement relating to any one or combination of components illustrated in the exemplary computing system 420. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Computing system 420 comprises a computer 441, which typically includes a variety of computer readable media. Computer readable media can be any available media that can be accessed by computer 441 and includes both volatile and nonvolatile media, removable and non-removable media. The system memory 422 includes computer storage media in the form of volatile and/or nonvolatile memory such as read only memory (ROM) 423 and random access memory (RAM) 460. A basic input/output system 424 (BIOS), containing the basic routines that help to transfer information between elements within computer 441, such as during start-up, is typically stored in ROM 423. RAM 460 typically contains data and/or program modules that are immediately accessible to and/or presently being operated on by processing unit 459. By way of example, and not limitation, FIG. 4 illustrates operating system 425, application programs 426, other program modules 427, and program data 428.

The computer 441 may also include other removable/non-removable, volatile/nonvolatile computer storage media. By way of example only, FIG. 4 illustrates a hard disk drive 438 that reads from or writes to non-removable, nonvolatile magnetic media, a magnetic disk drive 439 that reads from or writes to a removable, nonvolatile magnetic disk 454, and an optical disk drive 440 that reads from or writes to a removable, nonvolatile optical disk 453 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 438 is typically connected to the system bus 421 through a non-removable memory interface such as interface 434, and magnetic disk drive 439 and optical disk drive 440 are typically connected to the system bus 421 by a removable memory interface, such as interface 435.

The drives and their associated computer storage media discussed above and illustrated in FIG. 4, provide storage of computer readable instructions, data structures, program modules and other data for the computer 441. In FIG. 4, for example, hard disk drive 438 is illustrated as storing operating system 458, application programs 457, other program modules 456, and program data 455. Note that these components can either be the same as or different from operating system 425, application programs 426, other program modules 427, and program data 428. Operating system 458, application programs 457, other program modules 456, and program data 455 are given different numbers here to illustrate that, at a minimum, they are different copies. A user may enter commands and information into the computer 441 through input devices such as a keyboard 451 and pointing device 452, commonly referred to as a mouse, trackball or touch pad. Other input devices (not shown) may include a microphone, joystick, game pad, satellite dish, scanner, or the like. These and other input devices are often connected to the processing unit 459 through a user input interface 436 that is coupled to the system bus, but may be connected by other interface and bus structures, such as a parallel port, game port or a universal serial bus (USB). The cameras 226, 228 and capture device 120 may define additional input devices for the computing system 420 that connect via user input interface 436. A monitor 442 or other type of display device is also connected to the system bus 421 via an interface, such as a video interface 432. In addition to the monitor, computers may also include other peripheral output devices such as speakers 444 and printer 443, which may be connected through an output peripheral interface 433. Capture Device 120 may connect to computing system 420 via output peripheral interface 433, network interface 437, or other interface.

The computer 441 may operate in a networked environment using logical connections to one or more remote computers, such as a remote computer 446. The remote computer 446 may be a personal computer, a server, a router, a network PC, a peer device or other common network node, and typically includes many or all of the elements described above relative to the computer 441, although only a memory storage device 447 has been illustrated in FIG. 4. The logical connections depicted include a local area network (LAN) 445 and a wide area network (WAN) 449, but may also include other networks. Such networking environments are commonplace in offices, enterprise-wide computer networks, intranets and the Internet.

When used in a LAN networking environment, the computer 441 is connected to the LAN 445 through a network interface 437. When used in a WAN networking environment, the computer 441 typically includes a modem 450 or other means for establishing communications over the WAN 449, such as the Internet. The modem 450, which may be internal or external, may be connected to the system bus 421 via the user input interface 436, or other appropriate mechanism. In a networked environment, program modules depicted relative to the computer 441, or portions thereof, may be stored in the remote memory storage device. By way of example, and not limitation, FIG. 4 illustrates application programs 448 as residing on memory device 447. It will be appreciated that the network connections shown are exemplary and other means of establishing a communications link between the computers may be used.

As explained above, the capture device 120 provides RGB images (also known as color images) and depth images to the computing system 112. The depth image may be a plurality of observed pixels where each observed pixel has an observed depth value. For example, the depth image may include a two-dimensional (2-D) pixel area of the captured scene where each pixel in the 2-D pixel area may have a depth value such as a length or distance in, for example, centimeters, millimeters, or the like of an object in the captured scene from the capture device.

Figure 5:
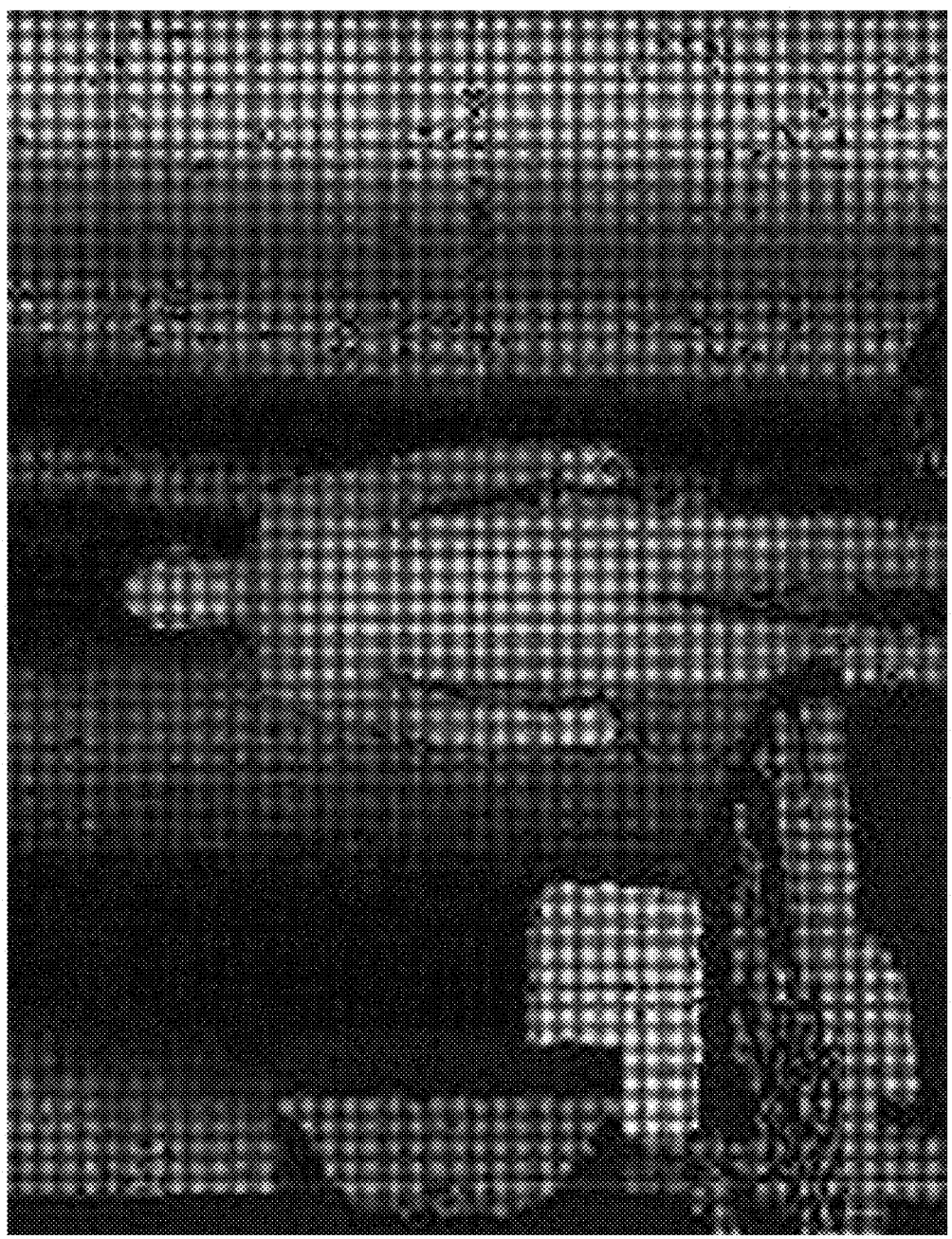
FIG. 5 illustrates an exemplary depth image.

FIG. 5 illustrates an example embodiment of a depth image that may be received at computing system 112 from capture device 120. According to an example embodiment, the depth image may be an image and/or frame of a scene captured by, for example, the 3-D camera 226 and/or the RGB camera 228 of the capture device 120 described above with respect to FIG. 2A. As shown in FIG. 5, the depth image may include a human target corresponding to, for example, a user such as the user 118 described above with respect to FIGS. 1A and 1B and one or more non-human targets such as a wall, a table, a monitor, or the like in the captured scene. The depth image may include a plurality of observed pixels where each observed pixel has an observed depth value associated therewith. For example, the depth image may include a two-dimensional (2-D) pixel area of the captured scene where each pixel at particular x-value and y-value in the 2-D pixel area may have a depth value such as a length or distance in, for example, centimeters, millimeters, or the like of a target or object in the captured scene from the capture device. In other words, a depth image can specify, for each of the pixels in the depth image, a pixel location and a pixel depth. Following a segmentation process, each pixel in the depth image can also have a segmentation value associated with it. The pixel location can be indicated by an x-position value (i.e., a horizontal value) and a y-position value (i.e., a vertical value). The pixel depth can be indicated by a z-position value (also referred to as a depth value), which is indicative of a distance between the capture device (e.g., 120) used to obtain the depth image and the portion of the user represented by the pixel. The segmentation value is used to indicate whether a pixel corresponds to a specific user, or does not correspond to a user.

In one embodiment, the depth image may be colorized or grayscale such that different colors or shades of the pixels of the depth image correspond to and/or visually depict different distances of the targets from the capture device 120. Upon receiving the image, one or more high-variance and/or noisy depth values may be removed and/or smoothed from the depth image; portions of missing and/or removed depth information may be filled in and/or reconstructed; and/or any other suitable processing may be performed on the received depth image.

Figure 6:
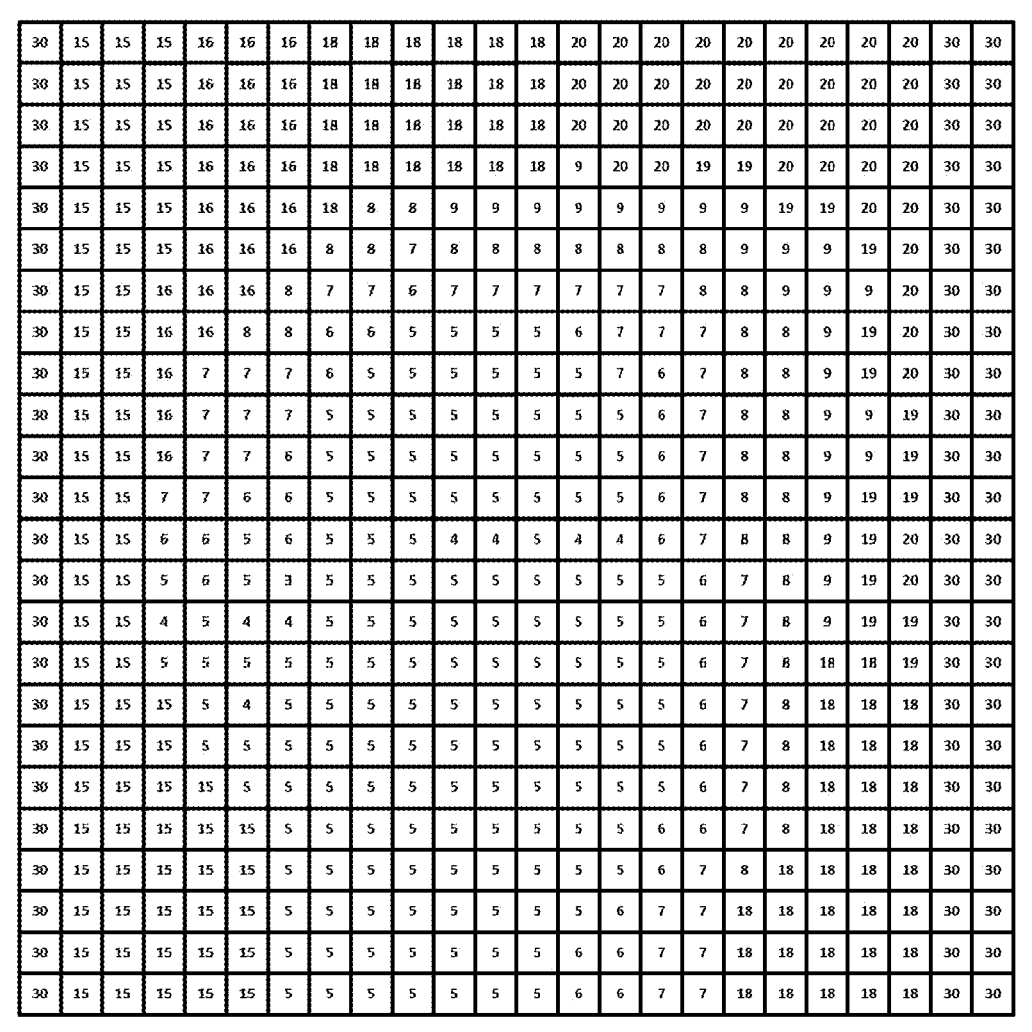

FIG. 6 provides another view/representation of a depth image (not corresponding to the same example as FIG. 5). The view of FIG. 6 shows the depth data for each pixel as an integer that represents the distance of the target to capture device 120 for that pixel. The example depth image of FIG. 6 shows 24×24 pixels; however, it is likely that a depth image of greater resolution would be used.

Illumination Modules

Various embodiments of illumination modules that include VCSEL arrays will now be described with reference to FIGS. 7A-10B. Such illumination modules can be used, for example, as the illumination module 256 shown in and described above with reference to FIG. 2B. It is noted that the relative sizes of the various elements shown in FIGS. 7A-10B are not drawn to scale.

Figure 7A:
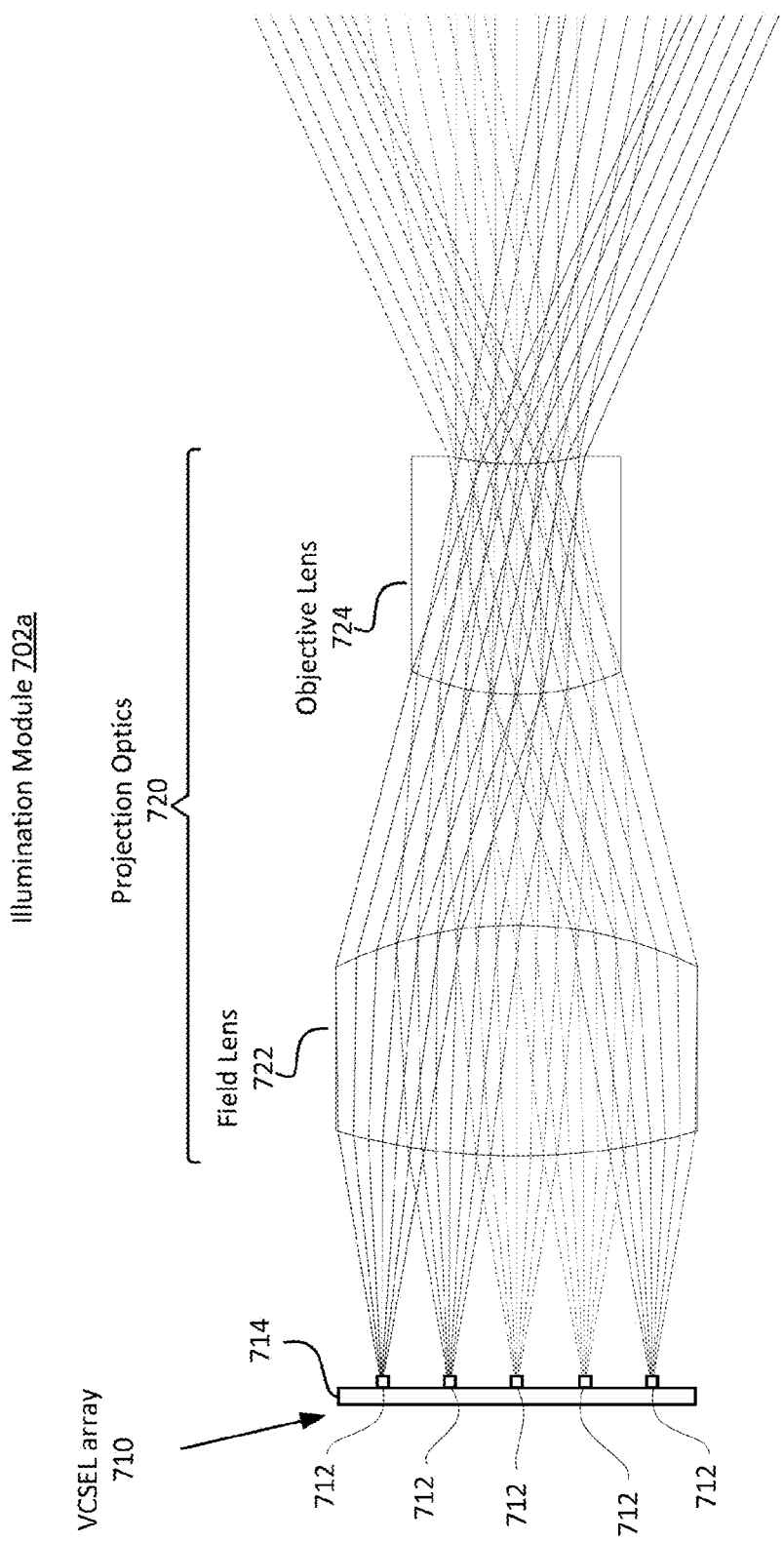
FIG. 7A illustrates a side-view of an illumination module for use in a depth image camera, according to an embodiment.

FIG. 7A illustrates an illumination module 702a that includes a VCSEL array 710 and projection optics 720. The VCSEL array 710 includes a plurality of VCSELs 712 formed on a semiconductor substrate 714. Each of the VCSELs 712 emits a separate beam of light, such that the plurality of VCSELs 712 collectively emits a light pattern. The projection optics 720 receives the light pattern emitted by the VCSELs 712 of the VCSEL array 710 and projects the light pattern. In accordance with an embodiment, the structured light output by the illumination module 702a, which can also be referred to as a structured light pattern, is the light pattern projected by the projection optics 720.

In the embodiment shown in FIG. 7A, the projection optics 720 is shown as including a field lens 722 and an objective lens 724. The field lens 722 receives the beams of light emitted by the VCSELs 712 of the VCSEL array 710 and converges the beams to a single pupil. The objective lens 724, which is positioned at the pupil, receives the converged beams from the field lens 722 and diverges the beams to produce the light pattern projected by the projection optics 720. Use of alternative projection optics are possible, and within the scope of alternative embodiments.

The light pattern projected by the projection optics 720 includes a number of features, which in accordance with an embodiment, is equal to the number of VCSELs 712 in the VCSEL array 710. In other words, in an embodiment there is a one-to-one correspondence between the number of VCSELs and the number of features in the projected light pattern. While only five VCSELs 712 are shown in FIG. 7A, the VCSEL array 710 likely includes a two dimensional array of VCSELs, such as a five-by-five array (and thus, e.g., twenty five total VCSELs), and more generally, an X-by-Y array of VCSELs (and thus, N total VCSELs, where N=X*Y). In certain embodiments, the VCSEL array 710 can include hundreds of VCSELs 712 manufactured on a single semiconductor substrate. For example, the VCSEL array 710 can include an array of 40×50 VCSELs 712, in which case the VCSEL array 710 would include two-thousand VCSELs 712.

Each feature of the structured light pattern output by the illumination module may produce, for example, a dot or spot on a surface of an object within the capture area of a depth camera including the illumination module 702a. Where structured light pattern includes IR light, such dots or spots would not be visible to the human eye, but would be detectable by an image detector module that is configured to captures an image of the structured IR light as reflected from one or more objects within the capture area. One or more processors can then produce depth images in dependence on the image captured by the image detector module, and use the depth images, e.g., to update an application.

Figure 7B:
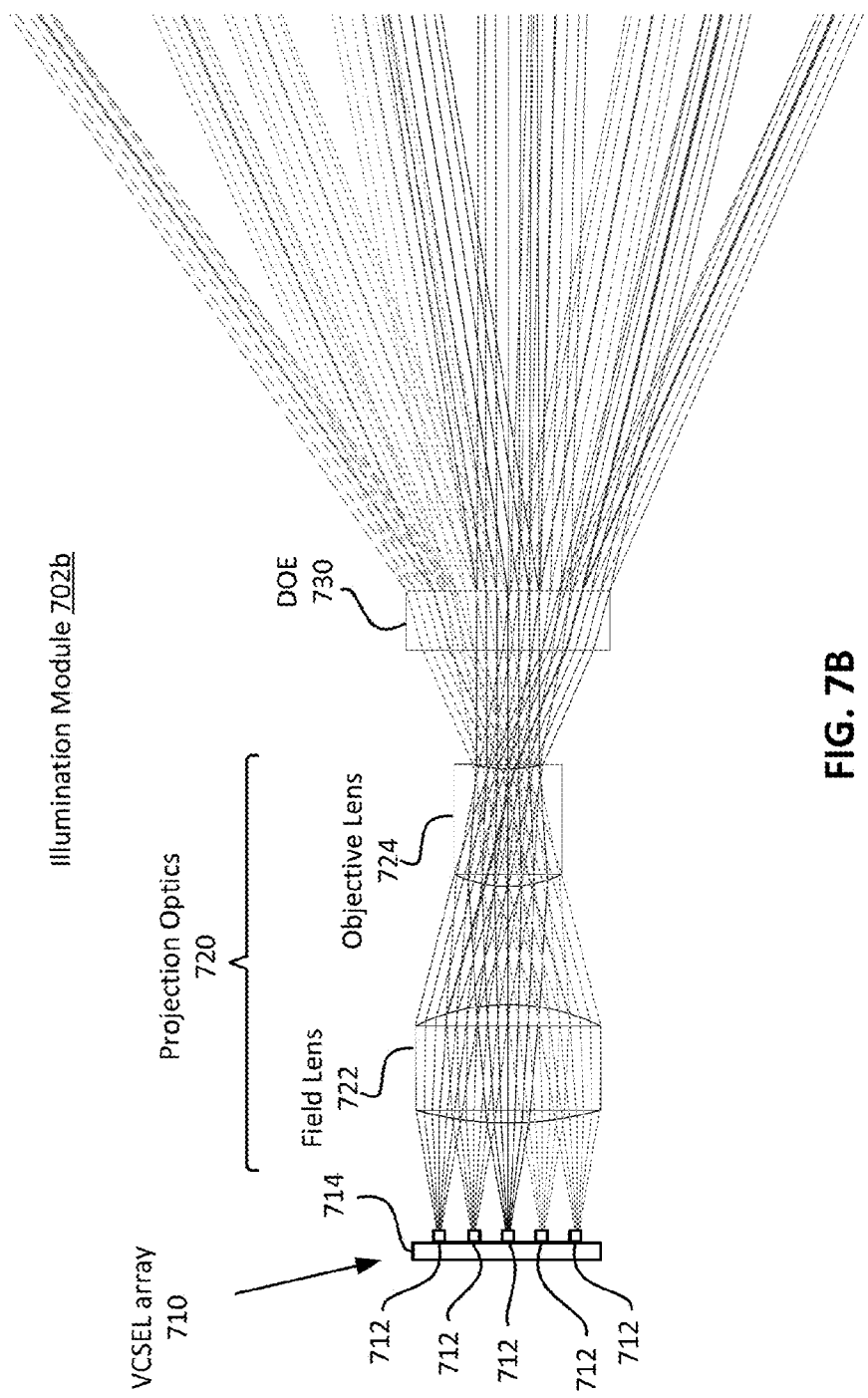
FIG. 7B illustrates a side-view of an illumination module for use in a depth image camera, according to another embodiment.

FIG. 7B illustrates an illumination module 702b according to another embodiment. The elements that are labeled the same in FIG. 7B as they were in FIG. 7A are the same, and thus, need not be described again. Referring to FIG. 7B, the illumination module 702b is shown as including a diffractive optical element (DOE) 730 optically downstream from the projection optics 720. In this embodiment, the DOE 730 is designed to cause the total number of features included in the structured light output by the illumination module 702b to be greater than the number of features included in the light pattern projected by the projection optics 720. More specifically, the DOE 730 increases the number of features (included in the light pattern projected by the projection optics) by an integer multiple. For example, the DOE 730 can be configured to double the number of features, such that if there were N features in the light pattern projected by the projection optics 720, the structured light pattern output by the DOE 730 would include N*2 features. For another example, the DOE 730 can be configured to triple the number of features, such that if there were N features in the light pattern projected by the projection optics 720, the structured light pattern output by the DOE 730 would include N*3 features. The DOE 730 can alternatively be configured to increase the number of features by an integer multiple that is greater than three.

Figure 7C:
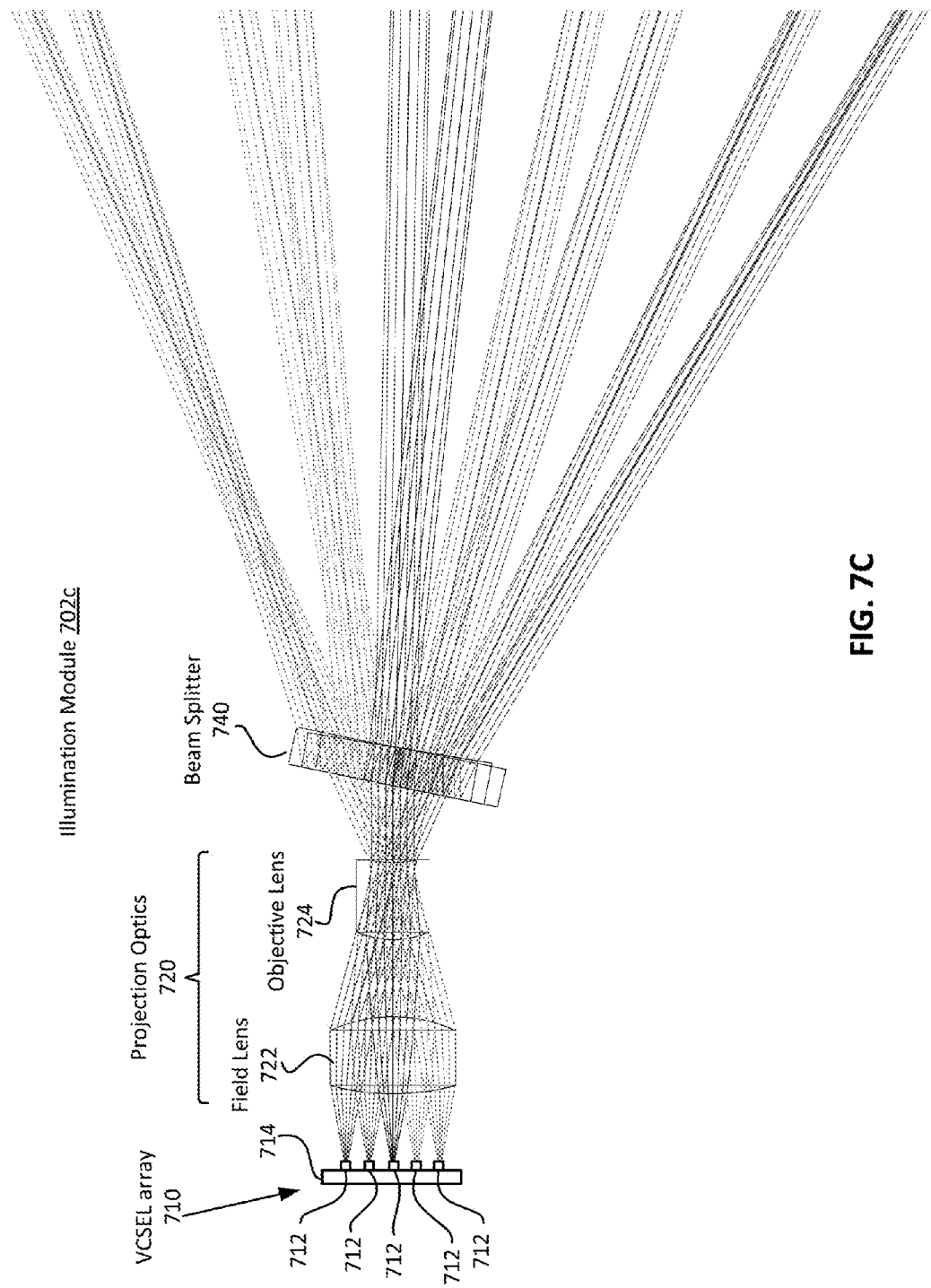
FIG. 7C illustrates a side-view of an illumination module for use in a depth image camera, according to still another embodiment.

FIG. 7C illustrates an illumination module 702c according to still another embodiment. The elements that are labeled the same in FIG. 7C as they were in FIG. 7A are the same, and thus, need not be described again. Referring to FIG. 7C, the illumination module 702c is shown as including a beam splitter 740 optically downstream from the projection optics 720. The beam splitter 740 doubles the number of features in the light pattern projected by the projection optics 720. For example, if there were N features in the light pattern projected by the projection optics 720, the structured light pattern output by the beam splitter 740 would include N*2 features.

The DOE 730 and the beam splitter 740 are each types of optical elements that cause the total number of features included in the structured light output by the illumination module to be greater than the number of features included in the light pattern projected by the projection optics 720. The use of such an optical element enables there to be more features in the structured light pattern, output by an illumination module, than there are individual VCSELs. Thus, if there is a desire to produce a structured light pattern having one thousand features, there need not be one thousand individual VCSELs 712 in the VCSEL array 710. Accordingly, such optical elements can be used to reduce the overall size and cost of the VCSEL array 710, and thus, the illumination module that includes the VCSEL array 710.

Figure 8:
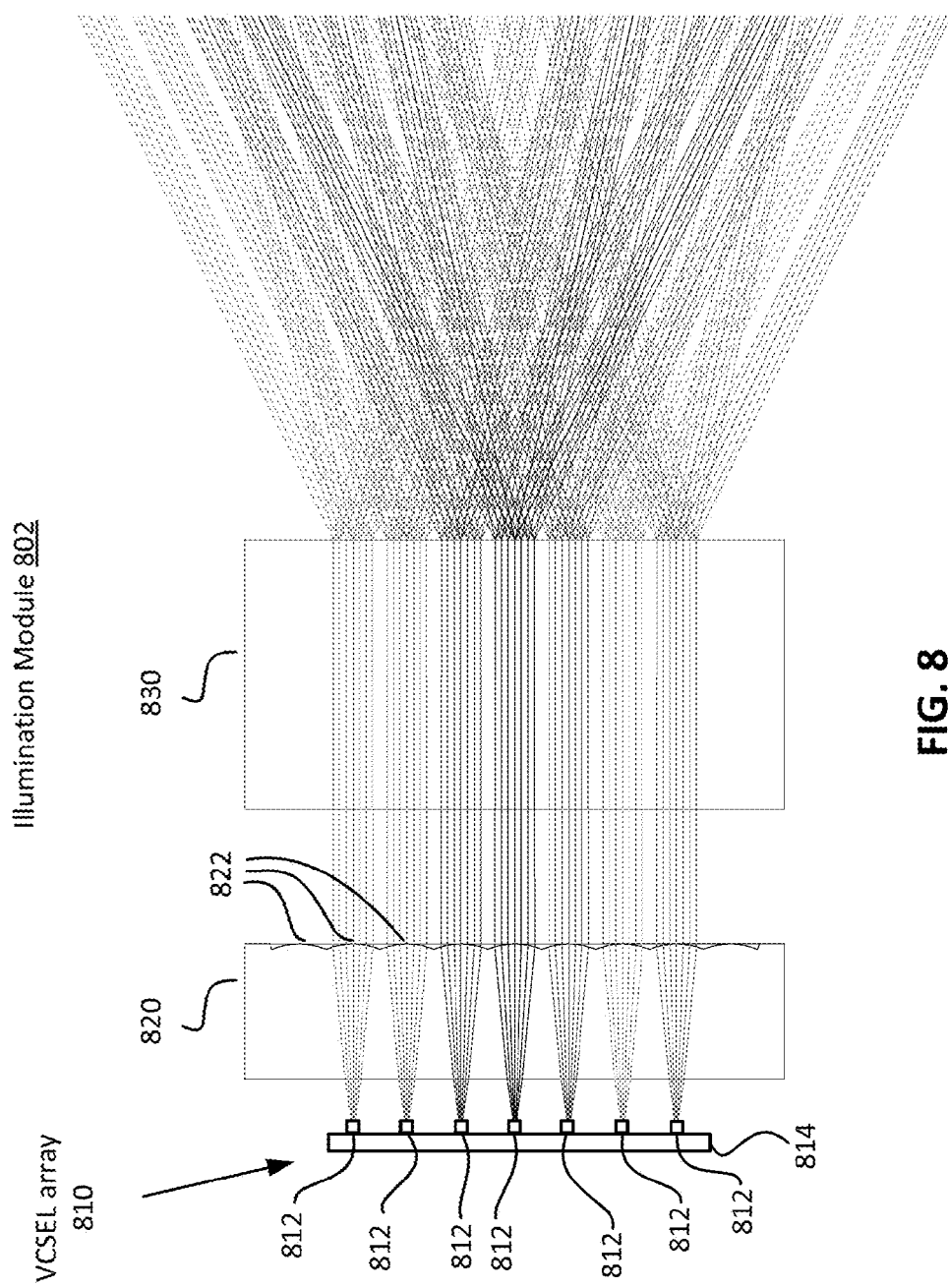
FIG. 8 illustrates a side-view of an illumination module for use in a depth image camera, according to an embodiment.

FIG. 8 illustrates another illumination module 802. The illumination module 802 is shown as including a VCSEL array 810, an optical element 820, and a further optical element 830. The VCSEL array 810 includes a plurality of VCSELs 812, each of which emits a separate beam of light. The VCSELs 812 are formed on a semiconductor substrate 814. In an embodiment, the optical element 820 is a first DOE, and the optical element 820 is a second DOE. In such an embodiment, the first DOE (i.e., the optical element 820) can have a periodic diffractive design and be configured to collimate each beam of light output by each of the plurality of VCSELs 812 of the VCSEL array 810. The second optical element 830, which as just mentioned can be a second DOE, is configured to receive the collimated beams produced by the optical element 820 (e.g., a first DOE) and output the structured light.

In an alternative, embodiment, the optical element 820 is implemented as a micro-lens array, instead of a DOE. Where the optical element 820 is a micro-lens array, the micro-lens array includes a plurality of lenslets 822, only some of which are labeled in FIG. 8. In such an embodiment, it is the lenslets 822 that collimate the beams of light output by the VCSELs 812 of the VCSEL array 810. In this and other embodiments that include a micro-lens array, the size of the lenslets specifies the divergence of individual features (e.g., spots or dots) in the far-field. The size of the lenslets also specifies a minimum feature size needed to obtain a maximum spatial frequency pattern.

Depending upon the design of the second optical element 830, which as mentioned above can be a DOE, the second optical element 830 can cause the number of features in the structured light output by the illumination module 802 to be an integer multiple of the number of VCSELs 812 and the VCSEL array. For example, optical element 830 can cause the number of features in the structured light output by the illumination module 802 to include two, three or four times as many features as there are VCSELSs 812, but is not limited thereto.

Where the second optical element 830 is a DOE, the DOE can be registered to individual lenslets for maximum spatial frequency performance. Alternatively, a phase function can be encoded over an entire pupil using a Gerchberg-Saxton algorithm.

While only seven VCSELs 812 are shown in FIG. 8, the VCSEL array 810 likely includes a two dimensional array of VCSELs, such an X-by-Y array of VCSELs (and thus, N total VCSELs, where N=X*Y). In certain embodiments, the VCSEL array 810 can include hundreds of VCSELs 812 manufactured on the single semiconductor substrate 814.

Figure 9:
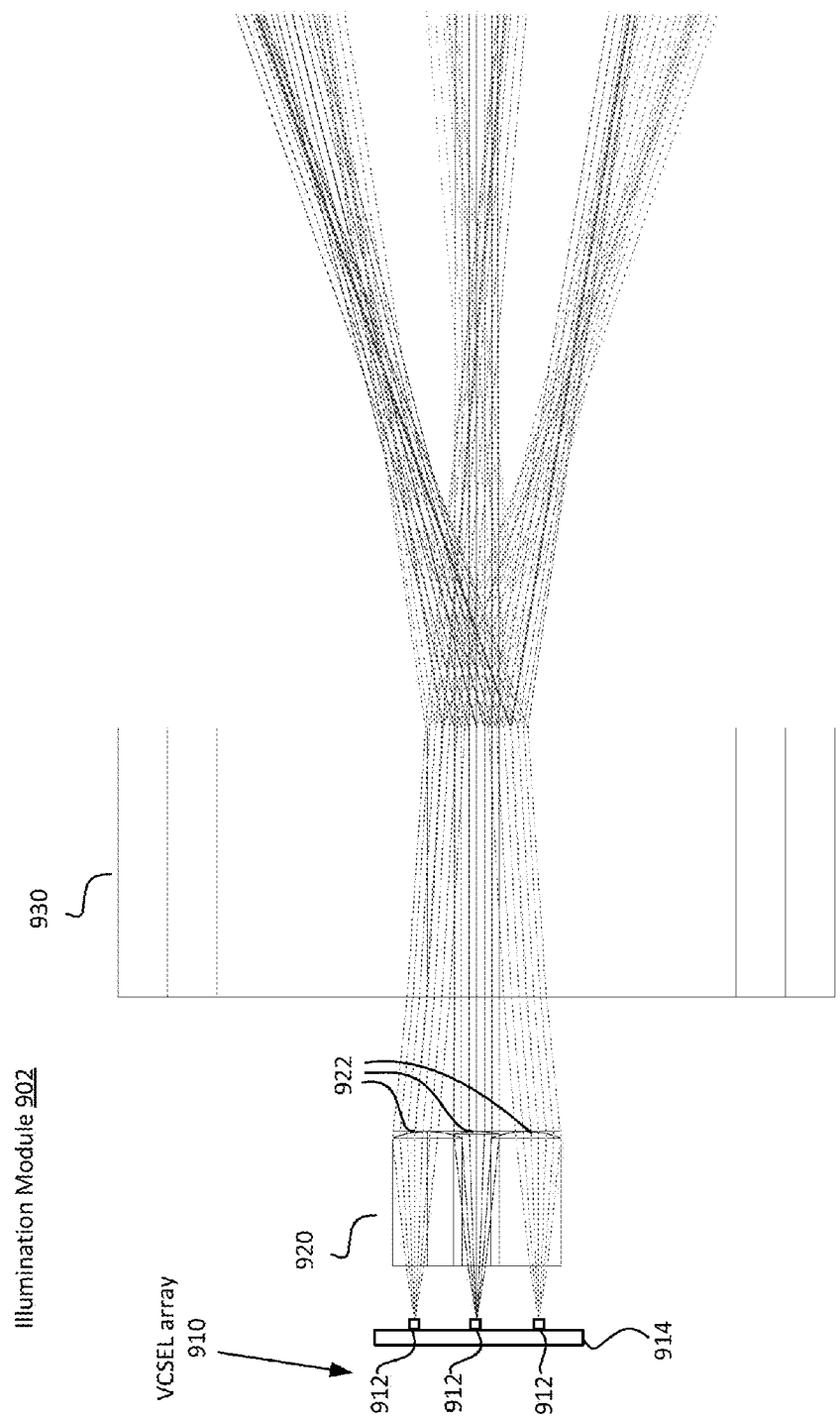
FIG. 9 illustrates a side-view of an illumination module for use in a depth image camera, according to another embodiment.

FIG. 9 illustrates an illumination module 902 according to another embodiment. The illumination module 902 is shown as including a VCSEL array 910, a micro-lens array 920 and a DOE 930. The VCSEL array 910 includes a plurality of VCSELs 912 formed on a semiconductor substrate 914, wherein each of the VCSELs 912 emits a separate beam of light. The micro-lens array 920 includes a plurality of lenslets 922. In this embodiment, the pitch of the micro-lens array 920, which is the center-to-center distance between neighboring lenslets 922 of the micro-lens array 920, is less than the pitch of the VCSEL array 910, which is the center-to-center distance between neighboring VCSELs 912 of the VCSEL array 910. The micro-lens array 920 is configured to collimate each beam of light output by each of the plurality of VCSELs 912 of the VCSEL array 910. However, because the pitch of the micro-lens array 920 is less than the pitch of the VCSEL array 910, the collimated beams output by the micro-lens array 920 converge. As can be appreciate from FIG. 9, the micro-lens array 920 is configured to converge the laser beams to a common pupil. More generally, the micro-lens array 920 has a pitch that is offset relative to the pitch of the VCSEL array 910, which causes light beams received by the micro-lens array 920, from the VCSEL array 910, to converge. The DOE 930 receives the converged light beams from the micro-lens array and outputs structured light used to illuminate a capture area. A benefit of having the light beams (also referred to as beam of light) converge to a single pupil, at which the DOE 930 is located, is that angular content for a given limit on a minimum feature size of the DOE 930 is significantly increased. Additionally, the DOE 930 need only include a single diffractive phase function.

While only three VCSELs 912 and three lenslets 922 are shown in FIG. 9, the VCSEL array 910 likely includes a two dimensional array of VCSELs and lenslets, such an X-by-Y array of VCSELs and lenslets (and thus, N total VCSELs and N total lenslets, where N=X*Y). In certain embodiments, the VCSEL array 910 can include hundreds of VCSELs 912 manufactured on the single semiconductor substrate 914. Similarly, the micro-lens array 920 can include hundreds of lenslets 922.

As was explained above with respect to the previously described embodiments, depending upon the design of the DOE 930, the DOE 930 can cause the number of features in the structured light output by the illumination module 902 to be an integer multiple of the number of VCSELs 912 and the VCSEL array 910. For example, DOE 930 can cause the number of features in the structured light output by the illumination module 902 to include two, three or four times as many features as there is VCSELSs 912, but is not limited thereto.

Figure 10B:
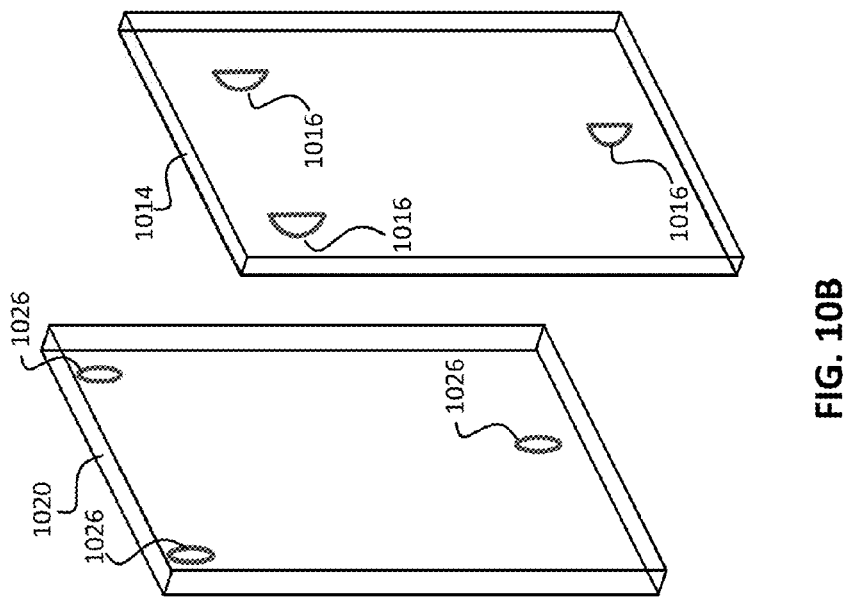
FIGS. 10A and 10B illustrate, respectively, a side-view and a reverse perspective view of an illumination module having components that includes alignment elements that enable various components of the illumination module to be easily and accurately aligned with one another in accordance with an embodiment.
Figure 10A:
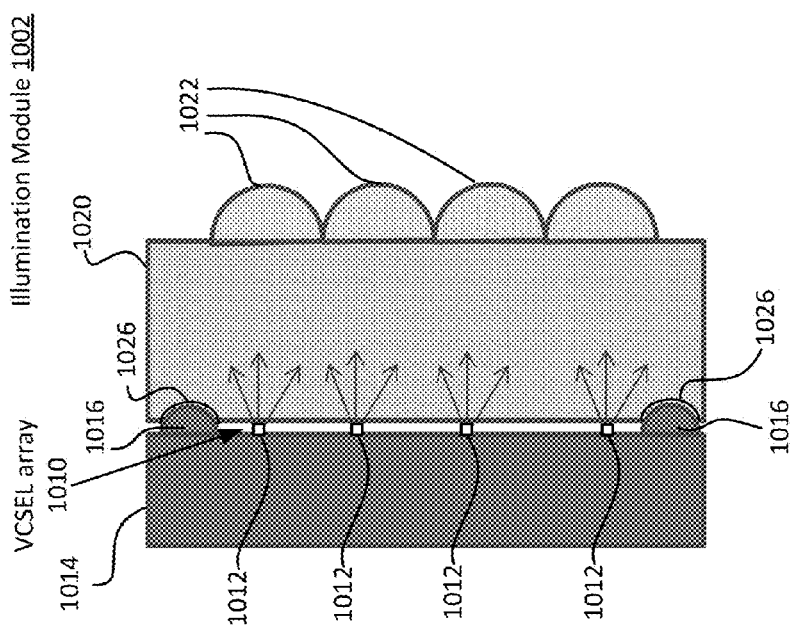

FIGS. 10A and 10B will now be used to describe how a VCSEL array can be aligned with an optical element, such as a micro-lens array, in accordance with an embodiment. FIG. 10A illustrates a side view of an illumination module 1002, or a portion thereof, that includes a VCSEL array 1010 including a plurality of VCSELs 1012 formed on a semiconductor substrate 1014. The illumination module 1002 also includes a micro-lens array 1020 that includes a plurality of lenslets 1022. FIG. 10B is a reverse perspective view of the semiconductor substrate 1014 and the micro-lens array 1020, but does not specifically show the VCSELs 1012 and the lenslets 1022.

As shown in FIGS. 10A and 10B, the semiconductor substrate 1014 includes first alignment elements 1016 and the micro-lens array 1020 includes corresponding second alignment elements 1026. The first and second alignment elements 1016, 1026 enable the semiconductor substrate 1014 (on which the VCSEL array 1010 is formed) to be easily and accurately aligned with the micro-lens array 1020 (which includes the lenslets 1022) during assembly of the illumination module 1002. The first alignment elements 1016 can be, for example, bumps, dowels, or other protrusions that extends from a surface of the semiconductor substrate 1014. The second alignment elements 1026 can be, for example, dimples, holes, or other indentations that extend into a surface of the micro-lens array 1020. It is also possible that the types of alignment elements be reversed, such that the semiconductor substrate 1014 includes indentations that extend into a surface of the semiconductor substrate 1014, and the micro-lens array 1020 includes protrusions that extend from a surface of the micro-lens array 1020. The alignment elements 1016 and 1026 can be manufactured, for example, using lithographic processes or other micro-fabrication processes, but is not limited thereto.

In FIGS. 10A and 10B, the semiconductor substrate 1014 is shown as including three of the first alignment elements 1016, and the micro-lens array 1020 is shown as including three second alignment elements 1026. However, other number of alignment elements are also possible, and within the scope of an embodiment. It is also noted that the alignment elements 1016 and 1026 can be located at different locations than shown in FIGS. 10A and 10B.

In FIGS. 10A and 10B, the alignment elements are show as being used to help align the semiconductor substrate 1014 with the micro-lens array 1020. Similar alignment elements can be used to help align a semiconductor substrate with a DOE, and/or a micro-lines array with a DOE.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the technology be defined by the claims appended hereto.

What is claimed is:

1. A depth camera system, comprising:
    an illumination module configured to output structured light that illuminates a capture area; and
    an image detector module configured to capture an image of the structured light as reflected from one or more objects within the capture area;
    the illumination module including
        a VCSEL array comprising a plurality of vertical cavity surface emitting lasers (VCSELs), wherein each of the VCSELs is configured to emit a separate beam of light, and wherein the plurality of VCSELs are configured to collectively emit a light pattern; and
        projection optics configured to receive the light pattern emitted by the VCSELs of the VCSEL array and project the light pattern;
    wherein the structured light output by the illumination module is created at least in part based on the light pattern projected by the projection optics;
    wherein the projection optics include
        a field lens that is positioned adjacent the VCSEL array and configured to receive the beams of light emitted by the VCSELs of the VCSEL array and converge the beams to a single pupil; and
        an objective lens that is positioned adjacent the field lens at the single pupil and configured to receive the converged beams from the field lens and diverge the beams to produce the light pattern projected by the projection optics.

2. The depth camera system of claim 1, wherein:
    the light pattern projected by the projection optics include a number of features; and
    the illumination module also includes an optical element that is positioned optically downstream from the projection optics and configured to cause a total number of features included in the structured light output by the illumination module to be greater than the number of features included in the light pattern projected by the projection optics.

3. The depth camera system of claim 2, wherein the optical element, that is positioned optically downstream from the projection optics, comprises a beam splitter that is configured to cause the total number of features included in the structured light output by the illumination module to be twice the number of features included in the light pattern projected by the projection optics.

4. The depth camera system of claim 2, wherein the optical element, that is positioned optically downstream from the projection optics, comprises a diffractive optical element (DOE) that is configured to cause the total number of features included in the structured light output by the illumination module to be an integer multiple of the number of features included in the light pattern projected by the projection optics.

5. The depth camera system of claim 4, wherein the diffractive optical element (DOE) is configured to cause the total number of features included in the structured light output by the illumination module to be twice or thrice the number of features included in the light pattern projected by the projection optics.

6. The depth camera system of claim 1, further comprising:
one or more processors configured to produce a depth image in dependence on the image captured by the image detector module.

7. The depth camera system of claim 6, wherein the one or more processors is/are also configured to update an application based on the depth image.

8. The depth camera system of claim 1, wherein the VCSEL array comprises an X-by-Y two dimensional array of VCSELs on a single semiconductor substrate.

9. A method, comprising:
emitting a separate beam of light from each of a plurality of vertical cavity surface emitting laser (VCSELs) of a VCSEL array to thereby collectively emit a light pattern;
receiving the beams of light emitted by the VCSELs of the VCSEL array, at a field lens that is adjacent the VCSEL array, and using the field lens to converge the beams to a single pupil;
receiving the converged beams from the field lens, at an objective lens that is positioned adjacent the field lens at the single pupil, and using the objective lens to diverge the beams to produce a projected light pattern;
illuminating a capture area with structured light that is created at least in part based on the projected light pattern produced using the objective lens; and
capturing an image of the structured light as reflected from one or more objects within the capture area.

10. The method of claim 9, wherein:
the projected light pattern, produced using the objective lens, includes a number of features; and
further comprising using an optical element, which is positioned optically downstream from the field lens and the objective lens, to cause a total number of features included in the structured light to be greater than the number of features included in the projected light pattern produced using the objective lens.

11. The method of claim 10, wherein the optical element that is optically downstream from the field lens and the objective lens comprises a beam splitter, and the using the optical element comprises using the beam splitter to cause the total number of features included in the structured light to be twice the number of features included in the projected light pattern produced using the objective lens.

12. The method of claim 10, wherein the optical element that is optically downstream from the field lens and the objective lens comprises a diffractive optical element (DOE), and the using the optical element comprising using the DOE to cause the total number of features included in the structured light to be an integer multiple of the number of features included in the projected light pattern produced using the objective lens.

13. The method of claim 12, wherein the using the DOE causes the total number of features included in the structured light to be twice or thrice the number of features included in the light pattern projected using the projection optics.

14. The method of claim 9, further comprising producing a depth image in dependence on the captured image.

15. The method of claim 14, further comprising updating an application based on the depth image.

16. The method of claim 9, wherein the VCSEL array comprises an X-by-Y two dimensional array of VCSELs on a single semiconductor substrate.

\* \* \* \* \*